US005706914A

United States Patent [19]
Goldstein

[11] Patent Number: 5,706,914
[45] Date of Patent: Jan. 13, 1998

[54] BRAKE CABLE LEVER ARM

[75] Inventor: Charles D. Goldstein, Sumter, S.C.

[73] Assignee: Robert Bosch Technology Corporation, Broadview, Ill.

[21] Appl. No.: 791,791

[22] Filed: Jan. 29, 1997

[51] Int. Cl.$^6$ .............................. B60T 1/00; F16D 51/00
[52] U.S. Cl. .......................... 188/2 D; 188/331; 74/502.6
[58] Field of Search ................ 188/2 D, 106 F, 188/106 A, 78, 325, 331, 328; 74/502.6, 502.4, 502.5

[56] References Cited

U.S. PATENT DOCUMENTS

| | | |
|---|---|---|
| 1,948,268 | 2/1934 | Kitto . |
| 2,094,391 | 9/1937 | White . |
| 2,260,645 | 10/1941 | Sinclair . |
| 2,404,054 | 7/1946 | Goepfrich . |
| 3,064,767 | 11/1962 | Wieger . |
| 3,517,779 | 6/1970 | Bolenbaugh . |
| 3,661,233 | 5/1972 | Margetts . |
| 4,364,284 | 12/1982 | Tani et al. ............... 74/502.6 |
| 4,364,456 | 12/1982 | Colpaert . |
| 4,595,084 | 6/1986 | LeDeit . |
| 4,753,325 | 6/1988 | Jaksle . |
| 4,872,533 | 10/1989 | Boyer . |
| 4,886,134 | 12/1989 | Yamamoto ............... 188/2 D |
| 4,886,146 | 12/1989 | Copp ...................... 188/2 D |
| 5,002,159 | 3/1991 | Brix et al. ................ 188/2 D |
| 5,137,120 | 8/1992 | Barbosa . |
| 5,142,935 | 9/1992 | Carr ....................... 74/502.6 |
| 5,377,789 | 1/1995 | Brooks, Sr. et al. ...... 188/2 D |
| 5,538,116 | 7/1996 | Parker et al. ............ 188/2 D |

FOREIGN PATENT DOCUMENTS 2 599 797   6/1987   France .

*Primary Examiner*—Douglas C. Butler
*Attorney, Agent, or Firm*—Leo H. McCormick, Jr.

[57] ABSTRACT

A parking brake assembly for connecting a cable to a lever. The lever has a generally flat base member pivotally mounted on the second brake shoe with a first end connected to the first brake shoe and a second end joined to a brake cable. The cable is located in a helical guide spring retained in a spring support which extends from the base member. A front face on the ramp is initially engaged by a tip of the cable while the slot forms a guide to allow an input force to move the tip over a lip on the end of the second tine. Once the tip has moved past the second tine, the cable tries to straighten out to eliminate any flexure induced by moving up the ramp by snapping into the slot and become aligned with the helical spring. A force applied to the cable which pulls the tip into engagement with a rear face on the ramp to complete the connection between the cable and lever. The projection assures that the cable remains located in the slot no matter how far the tip moves past the lip on the second tine.

5 Claims, 2 Drawing Sheets

BRAKE CABLE LEVER ARM

This invention relates to a lever arm having guide means to direct a tip on an end of a parking brake cable into a retaining slot.

BACKGROUND OF THE INVENTION

Blind cable connections for joining a brake cable to a lever arm have been disclosed in the prior art and most notably by U.S. Pat. Nos. 4,753,325, 4,872,533, 4,930,605 and 5,137,120. The lever arms disclosed in these patents function in an expectable manner during a normal connection. However under some circumstances during the assembly of the cable with the lever arm an operator may insert the cable into the assembly such that a tip on the end of the cable extends past and is directed away from the mounting connection on the end of the lever arm of the blind connection. Later, when an attempt is made to locate the brake cable in a slot on the mounting connection on the brake lever, the cable is positioned between the mounting connection and the brake lever arm. Still later when an actuator is connected to the brake cable, the brake cable is too short and if connected, the tip will not be secure with respect to the mounting connection and actuation of the lever arm by movement of the brake cable will not position the brakes to achieve a desired braking condition.

The present invention was developed to assist in the assembly of a blind brake cable with a lever arm to eliminate inaccurate or incorrect joining of a brake cable with a lever arm in a parking brake apparatus through the use of means which guides a tip on the brake cable into a slot in the lever arm.

SUMMARY OF THE INVENTION

A primary object of the present invention is to provide a parking brake assembly having a blind cable connection with means whereby a tip on a brake cable is guided in a first direction by a tine of a fork on a ramp adjacent the end of a lever arm along a path such that the brake cable is always pulled into the fork.

The specific structure of the present invention includes a lever arm having a ramp located adjacent a first end and opposite a spring support on the lever arm. The ramp has a slot in axial alignment with an opening of the spring support and first and second tines which form the fork that extends from the ramp. The first and second tines both extend to a height of approximately the apex of the opening in the spring support while the first tine has a projection that extends along an arcuate path in a same plane as the first tine. An end winding on a helical spring is retained in the opening of the spring support. During the assembly of the brake cable with the lever arm, the cable is inserted into the helical spring and pushed until a tip engages the ramp of the lever arm. Further force is applied causing the tip to ride up the ramp and between the first and second tines to the apex of the second tine. Additional force moves the tip over the second tine, after which the tip drops into the slot in the ramp. The direction of the force is reversed such that the cable is pulled and the tip brought into engagement with a rear face on the ramp to complete the joining of the brake cable with the lever arm. During assembly, should the additional force that moves the tip over the apex of the second tine cause the tip to engage and move along the rim of a brake shoe, the arcuate projection on the first tine prevents the cable from riding over the first tine. Thereafter, when the cable is pulled, the tip is directed by arcuate projection into the slot in the ramp to assure that the desired engagement between the tip and the ramp is achieved.

An advantage of this invention provides over the current connections resides in the assurance of locating the brake cable in a slot on a ramp of a connection member such that a tip on the brake cable is engaged with a rear surface on the ramp to create a positive joint for the brake cable with the lever arm.

DETAILED DESCRIPTION

Figure 1:
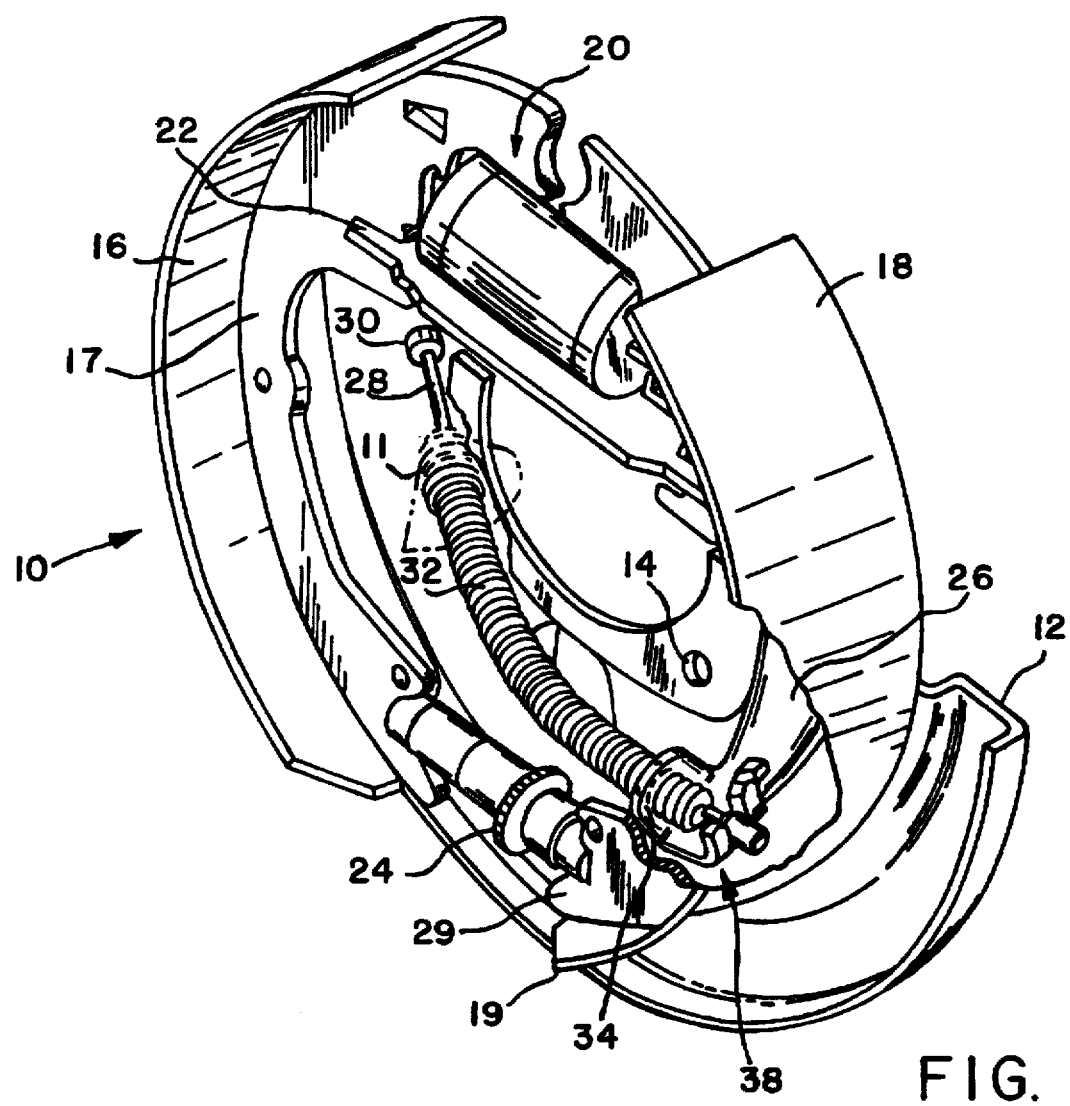
FIG. 1 is a perspective front view of a drum brake with a parking brake apparatus having a blind cable connection made according to the principles of this invention.
Figure 8:
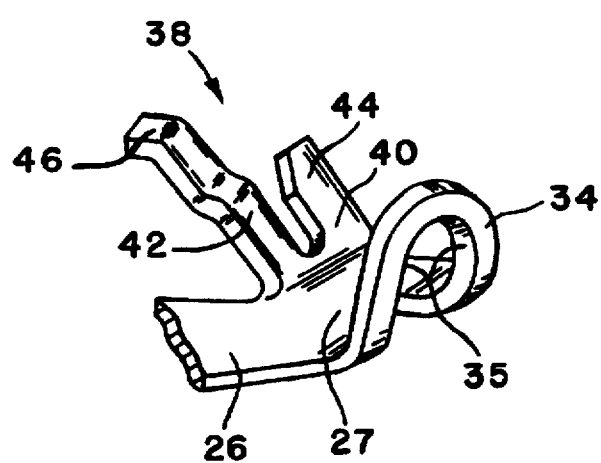
FIG. 8 is a partial prospective view of the end of the lever arm of FIG. 1 illustrating the present invention.

The drum brake 10 for a vehicle shown in FIG. 1 includes a stationary backing plate 12 attached to the axle housing of the vehicle by bolts 14. First 16 and second 18 brake shoes retained on the backing plate 12 are functionally operated by a wheel cylinder 20 in a conventional manner. A strut 22 is located between a first end of the first 16 and second 18 brake shoes and an adjustment screw 24 is located on a second end of the first 16 and second 18 brake shoes to maintain friction material on the first 16 and second 18 brake shoes with respect to a brake drum (not shown). A parking brake lever 26 is pivotally mounted on the web 29 of the second 18 brake shoe and is connected by strut 22 to the web 17 of the first 16 brake shoe. The parking brake lever 26 moves the first 16 and second 18 brake shoes toward a locked condition to effect a parking brake application in response to an input force being applied to the lever arm by pulling on cable 28 of the brake cable assembly 30. The cable 28 extends longitudinally through a helical guide spring 32 located between an opening 11 contained in the backing plate 12 and a spring support 34 integral with the parking brake lever 26, as best shown in FIG. 8. A connection 38 joins a tip end 36 of the cable 28 with the parking brake lever 26 such that when the cable 28 is pulled the lever 26 to effect the parking brake application.

The connection 38 includes a ramp 40 which is located adjacent the end 27 of the brake lever 26. Ramp 40 which extends from the surface of the brake lever 26 and is located opposite the spring support 34 and includes an incline which forms an acute angle with respect to the axis of the spring support 34. First 42 and second 44 tines form a fork which extends from the ramp 40. The first 42 and second 44 tines both extend to a height of approximately the apex of the opening 35 in the spring support 34 while the first tine 42 has a projection 46 that extends along an arcuate path in a same plane as the first tine 42. The length of the projection 46 is limited such that no interference will occur with the shoe rim 19 of the second brake shoe 18.

Figure 2:
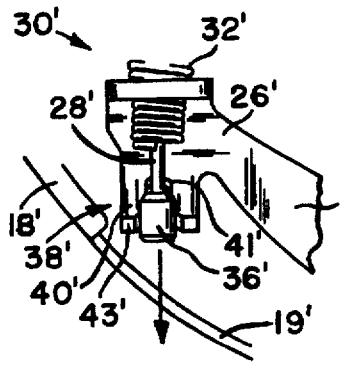
FIGS. 2, 3 and 4 are views illustrating a desired series of steps to achieve a connection between a lever arm and brake cable of the prior art.
Figure 3:
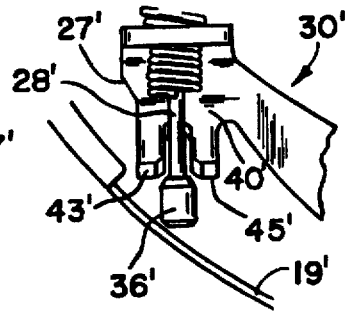
Figure 4:
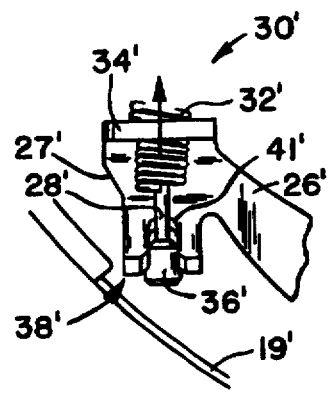

FIGS. 2, 3 and 4 illustrate a connection 38' for joining a brake cable assembly 30' with a parking brake lever 26'. The connection is achieved through the following steps: Brake cable 28' is inserted in the helical spring guide 32' and pushed until tip 36' engages ramp 40', see FIG. 2. Further force is applied to push tip 36' up ramp 40' and over the lip 43' to a position as shown in FIG. 3. Brake cable 28' is flexed as it passes through the helical guide spring 32' and up the incline of ramp 40'. When tip 36' moves past lip 43', cable 28' snaps into slot 41' as the flexed cable 28' tries to straighten out such that tip 36' drops behind the ramp 40'. The force on cable 28' is reversed such that cable 28' is now pulled to move tip 36' into engagement with back face of ramp 40' to complete the attachment of brake cable 28' with parking lever 26'. The connection 38' illustrated in FIG. 4 is a desired connection such that an input force applied to brake cable 28' can now move parking lever 26' and impart a force to bring the friction material on first 16 and second 18 brake shoes into engagement with a brake drum to effect a parking brake application.

Figure 5:
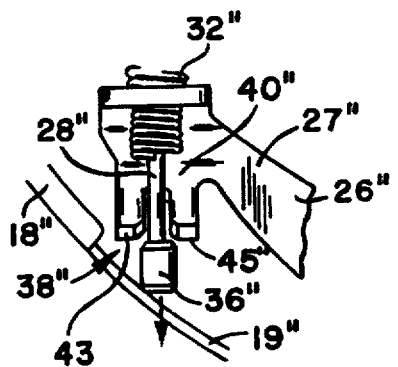
FIGS. 5, 6 and 7 are views illustrating a series of undesirable steps which could occur during the connection between a lever arm and brake cable of the prior art.
Figure 6:
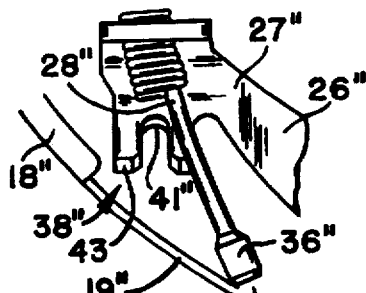
Figure 7:
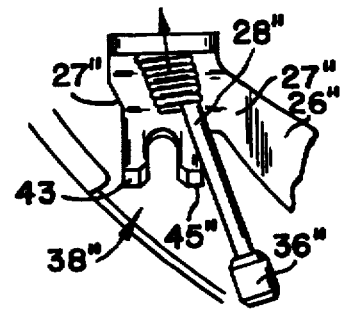

FIGS. 5, 6 and 7 illustrate a connection 38" which is not acceptable and can occur in the prior type parking brake apparatus. In connection 38", the input force which moves the tip 36" on brake cable 28" up ramp 40" is such that tip 36" moves over lip 43" and into engagement with rim 19" on brake shoe 18", see FIG. 5. Still further force is applied to the brake cable 28" and because of the engagement with arcuate surface of rim 19" and in trying to straighten out, tip 36" moves along rim 19" such that cable 28" is now out of alignment with slot 41" as shown in FIG. 6. When the insertion force is terminated, and reversed to provide a pull on cable 28", tip 36" is now located between edge 45" and the flat surface 27" on the parking lever 26". If the length of cable 28" is sufficient to attach an actuator when a brake actuation force is applied to effect a parking brake application, tip 36" will slide but will not impart movement to parking lever 26" to move the first 16 and second 18 brake shoes into engagement with the brake drum.

MODE OF OPERATION OF THE INVENTION

Figure 9:
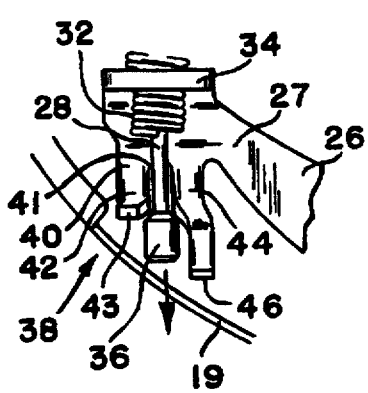
FIGS. 9, 10 and 11 are view illustrating a series of steps to achieve the desired connection between the lever arm and brake cable for the parking brake apparatus of FIG. 1.
Figure 10:
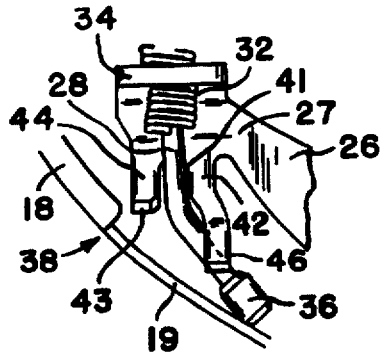
Figure 11:
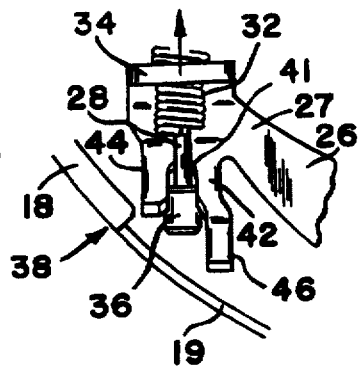

The connection 38 and method for joining a brake cable 28 with a parking brake lever 26 for the parking brake apparatus of FIG. 1 is illustrated in FIGS. 9, 10 and 11. The method is as follow: Brake cable 28 is inserted in the helical spring guide 32 and pushed until tip 36 engages ramp 40. Further force is applied to push tip 36 up ramp 40 and over the lip 43 on tine 42 to a position as shown in FIG. 9. Brake cable 28 is flexed as it passes through the helical guide spring 32 and up the incline of ramp 40. When tip 36 moves past lip 43, cable 28 snaps into slot 41 as the flexed cable 28 tries to straighten out such that tip 36 drops behind the ramp 40. The force on cable 28 is reversed such that the cable 28 is now pulled to move tip 36 into engagement with back face of ramp 40 as shown in FIG. 11 to complete the attachment of brake cable 28 with parking lever 26. An input force applied to brake cable 28 can now move parking lever 26 and impart a force to bring the friction material on first 16 and second 18 brake shoes into engagement with a brake drum to effect a parking brake application.

Under some circumstances, the input force which moves the tip 36 on brake cable 28 up ramp 40 is such that tip 36 moves over lip 43 and into engagement with rim 19 on brake shoe 18 as shown in FIG. 9. In this situation, when the force is reversed and the cable 28 pulled, tip 36 will still be aligned in slot 41 and brought into engagement with the back surface on ramp 40 to achieve the connection as shown in FIG. 11. Should the insertion force on cable 28 be such that when tip 36 engages rim 19 on brake shoe 18 and follows an arcuate path as illustrated in FIG. 10, the arcuate projection 46 holds cable 28 such that the cable 28 is retained in slot 41 and when the force is reversed, tip 36 is brought back into engagement with the back surface on ramp 40 to complete the connection in a desired manner such that an actuator input is applied through parking brake lever 26 to effect a parking brake application.

I claim:

1. A parking brake lever having a connection for use in a blind cable parking brake assembly, said lever moving first and second brake shoes in response to an input supplied by an actuator, said parking brake lever comprising:

a generally flat base member pivotally mounted on said second brake shoe, said flat base having a first end connected to said first brake shoe and a second end;

a spring support extending at an angle approximately perpendicular to said flat base and located adjacent said second end, said spring support having an opening for retaining an end of a helical guide spring, said opening having an apex in a plane substantially perpendicular to said flat base, said helical guide spring aligning a tip on a cable along an axial line perpendicular to said second end of said flat base; and mounting means extending from the flat base member adjacent said second end and opposite said spring support, said mounting means having a ramp which extends at an obtuse angle from the base member and first and second tines that extend from the ramp, first and second tines forming a slot which is in axial alignment with said opening in said spring support, said first and second tines having a vertical height of approximately the apex of said opening in said spring support, said first tine having a projection that extends therefrom along an arcuate path parallel to said first tine, said ramp having a front face initially engaging said tip of said cable while said slot forms a guide to move said tip over a lip of said second tine and thereafter into engagement with a rear face on said ramp, said projection assuring that the cable remains located in said slot no matter how far said tip moves past said lip on said second tine.

2. The parking brake lever as recited in claim 1 wherein said projection is offset from said first tine a distance of approximately equal to one half the diameter of said tip.

3. The parking brake lever as recited in claim 2 wherein the length of said arcuate path of said projection does not interfere with a rim on said second brake shoe.

4. The parking brake lever as recited in claim 3 wherein said projection allows said tip of said cable to travel in an arc corresponding to said rim of said second brake shoe.

5. The parking brake lever as recited in claim 4 wherein said arcuate path of said projection is approximately equal to an arc of 45 degrees.

* * * * *